United States Patent [19]

Wenz

[11] 4,018,087
[45] Apr. 19, 1977

[54] METHOD AND APPARATUS FOR TESTING THE UNIFORMITY OF A ROTARY BODY

[75] Inventor: Friedrich Wenz, Seeheim, Germany
[73] Assignee: Gebr. Hofmann KG, Darmstadt, Germany
[22] Filed: Aug. 2, 1976
[21] Appl. No.: 711,073
[30] Foreign Application Priority Data
Aug. 14, 1975 Germany .......................... 2536332
[52] U.S. Cl. .................................. 73/146; 73/462; 235/151.3
[51] Int. Cl.$^2$ ....................................... G01M 17/02
[58] Field of Search ........... 73/462, 146; 235/151.3
[56] References Cited
UNITED STATES PATENTS
3,490,277  1/1970  Sanders et al. ...................... 73/146
3,527,103  9/1970  Hale et al. ........................... 73/462
3,550,442  12/1970 Carr et al. ............................ 73/146

Primary Examiner—James J. Gill
Attorney, Agent, or Firm—Cushman, Darby & Cushman

[57] ABSTRACT

A method and apparatus for testing the uniformity of a rotary body whereby an electrical analysis signal is produced by travel measuring or force measuring transducers having an amplitude which varies as a function of the non-uniformities, multiplied by a direct current signal which varies as a function of the speed of rotation of the body to produce a further signal which is then integrated to provide the Fourier coefficients of the Fourier development series of the analysis signal.

13 Claims, 2 Drawing Figures

Fig. 1

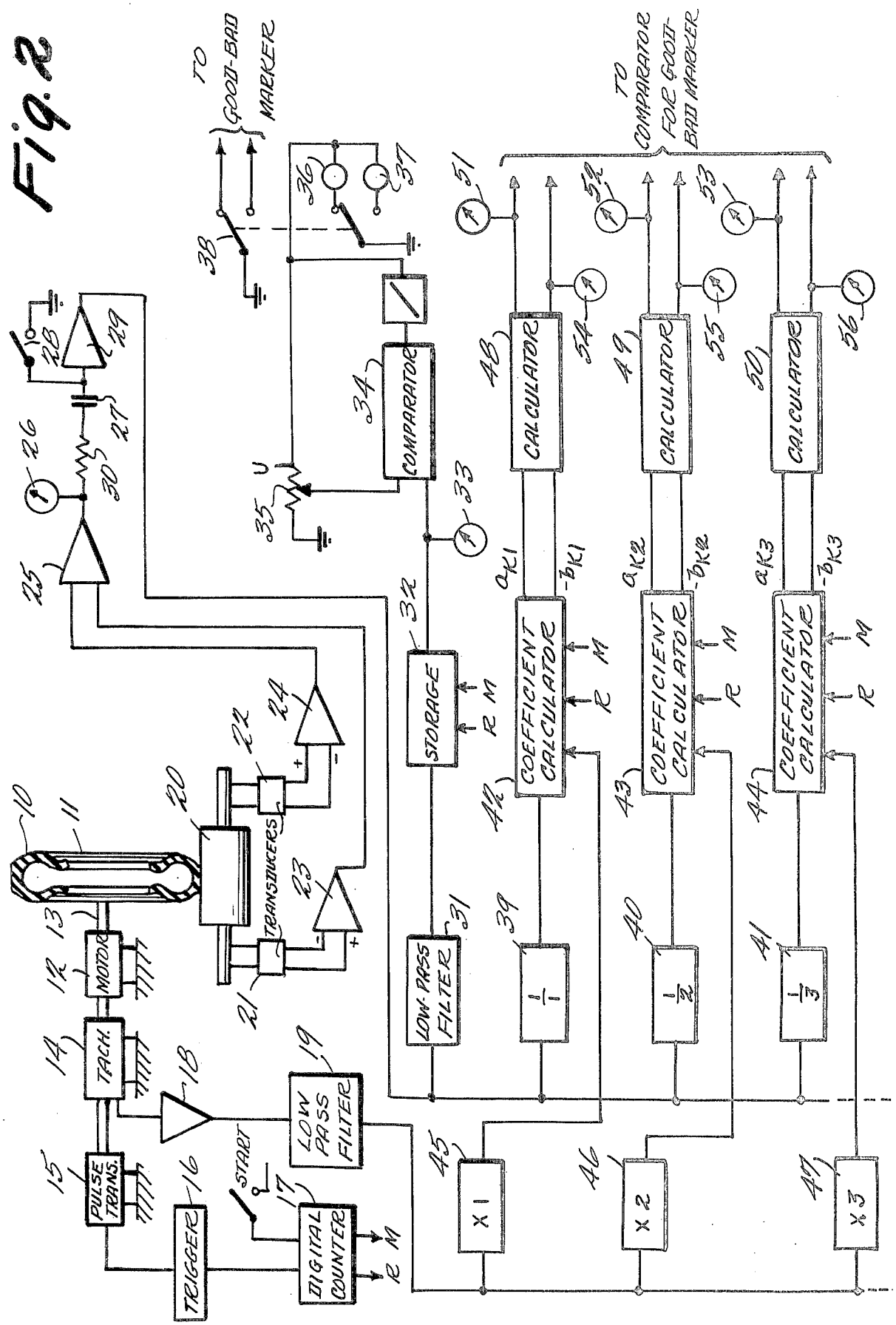

METHOD AND APPARATUS FOR TESTING THE UNIFORMITY OF A ROTARY BODY

The invention relates to a method and apparatus for testing the uniformity of a rotary body, such as a motor vehicle tire.

Apparatus for this purpose has been proposed in which during rotation of the rotary body, an irregularity or a non-uniformity in the rotary body causes an electrical analysis signal to be produced by means of travel-measuring or force-measuring transducers, the amplitudes of the analysis signal being proportional to the non-uniformities; the Fourier harmonic coefficients of the Fourier series from the analysis signal are formed by means of multipliers and integrator stages and from these coefficients the magnitude and the angular position or phase position of the non-uniformities are then determined.

With such a testing method and apparatus, it is desirable for the measuring time to be as short as possible, in order not to impede a high rate of throughput in the manufacture of rotary bodies such as motor vehicle tires. However, in the above-mentioned testing apparatus two or more revolutions of the rotary body to be tested are required, in order to determine the magnitude and the angular position of each non-uniformity of the rotary body. In addition, it is necessary for the rotary body which is to be tested to be brought up to a given rotational speed.

In one form of the previously proposed apparatus, use is made of an analog oscillator circuit which comprises a summing means, inverters and two integrators. The output signal of the oscillator circuit is connected to a harmonic amplitude detector circuit. After the expiration of one period of the testing operation, i.e., after one revolution of the rotary body, the detector circuit is activated so that the time lapse until the maximum of the harmonic reappears at the input to the detector circuit is at least one period (one revolution). This gives a time delay which is proportional to the duration of the period of the testing operation.

For determining the angular position of an irregularity, the previously propsed apparatus has an electrical circuit which determines the positively or negatively directed passage-through-zero of the sine function of the analysis signal. To this extent, there is a delay of at least one period of the testing operation, when determining the angular position of the irregularity.

Another form of apparatus has also been proposed, particularly for tire testing, by determining a lack of symmetry in the tire, in which the amplitudes of the harmonic components and the associated phase angle are determined by means of two analog oscillators, after the end of one period of the testing operation, from the Fourier coefficients of the Fourier series of the analysis signal. In this apparatus, the Fourier coefficients are taken from the first oscillator and introduced into the second oscillator as initial conditions therefor, the second oscillator being energized to a state of oscillation by means of such coefficients. Therefore, at least two periods, that is to say, two revolutions of the rotary body, are required in the testing operation, in order to be able to determine the Fourier coefficients.

For the purposes of determining the angular position and the magnitude of irregularities or non-uniformities from Fourier coefficients, other apparatus have been proposed which require squaring means and root-extraction means for determining magnitude and dividing means and function-producing means for tangent functions, for determining the angular position.

The previously proposed apparatus do not generally permit phase displacement independently of the rotary frequency of the rotary body to be tested. Such a phase displacement, i.e., a constant shift of angle of a circle of unit radius, is required however if there is an angular shift as between the measuring position and a fixed reference point for the purposes of determining angular position of the irregularity, or when a marking device with an angular shift is to be actuated in order to characterize the angular position of an extreme limit value.

A further difficulty can arise when there is a requirement for automatic and delay-free frequency tuning, at a variable rotary speed of the testing arrangement, without influencing the amplitude calibration of the arrangement. The frequency-determining means thus used in the previously proposed apparatus provide hyperbolic functions for the frequency change, with a linear variation, so that problems arise in connection with automatic fine tuning with the narrow band width required in harmonic analysis. As a result, it is necessary to carry out the testing operation with the rotary body rotating at a present rotary frequency; this means that the body to be tested must first be rotated up to a given frequency, and this, therefore, involves a time loss.

If Fourier coefficient analog computers are used to determine the harmonics, using a plurality of multiplication stages, an alternating current voltage which is proportional to the rotary speed of the rotary body would have to be provided for the multiplication stages, with an amplitude which is constant over the entire range of rotary speed, in order to determine the individual Fourier coefficients. It is then necessary either to use a corresponding number of generators to supply the constant-amplitude alternating current voltage, or corresponding mechanical drive transmission means must be provided in the generators.

Circuit arrangements have also been proposed for use in the analog computer art, for the dynamic simulation of oscillation differential equations. These circuits substantially comprise a circuit with feedback coupling, two integrator stages and an inverting summing means. This arrangement also involves an oscillator circuit which is not self-oscillatory so that either damping-reduction means must be employed or externally originating signals must be applied, the natural frequency of the circuit arrangement being determined by the time constants of the integration stages. If a periodic function is applied to the input of such a circuit, that function containing harmonic components and the circuit being tuned to that function in respect of its natural frequency, the result would be oscillation whose amplitude is proportional to the harmonic component of the input function, and the circuit, therefore, has a filter action.

However, such a circuit cannot readily be used for the analysis of periodic functions as the magnitude of the harmonics being sought, that is to say, the maximum value of an oscillation amplitude, is only available dynamically. In order to convert this maximum amplitude value into a direct current voltage, the oscillation must be introduced into a suitable maximum value storage means. This, however, cannot be effected before the expiration of the first period of the analysis signal, as the result is not established within that time.

If, however, the maximum value storage means is only actuated in the second period of the analysis signal, the time delay before the maximum value is available can be up to one period. In addition, account must be taken of the fact that the amplitude of oscillation of the circuit arrangement is determined not only by the harmonic portion component of the input function, but also by the number of periods of the input function that are applied to the circuit. Furthermore, the position of the harmonic results from a time difference between the beginning of the analysis operation and the passage-through-zero of the harmonic oscillation. This means that the angular position being sought is determined by a time measurement, and use is made of the fact that, when a period is of a known duration, the angle is a parameter that is proportional to time. At least one full period is required before determination of the angular position. As the angle is derived in relation to time, this means that the angular position result is dependent on the duration of the period of the input function. A circuit for providing a direct current voltage that is proportional to the angle is thus frequency-dependent, and must therefore be tuned to the duration of the periods to be analyzed.

In accordance with the present invention, there is provided a method of testing the uniformity of a rotary body, wherein during rotation of the body non-uniformities in the rotary body are determined by means of travel-measuring or force-measuring transducers which produce an electrical analysis signal whose amplitudes are proportional to the non-uniformities, wherein a direct current voltage signal that is proportional to the speed of rotation of the rotary body is obtained from the rotation of the rotary body to be tested, wherein said direct current voltage signal is multiplied with the analysis signal, thereby forming integrands which are integrated to provide the harmonic Fourier coefficients of the Fourier development series of the analysis signal, and wherein the magnitude and the phase position of the non-uniformities are determined from said Fourier coefficients.

In another aspect of the invention, there is provided apparatus for testing the uniformity of a rotary body, comprising: travel-measuring or force-measuring transducers operable to produce an analysis signal whose amplitudes are proportional to non-uniformities of said rotary body; a tachodynamo for producing a direct current voltage signal proportional to the rotational frequency of the rotary body; and means for forming harmonic Fourier coefficients of the Fourier series of the analysis signal, this latter means comprising, for each said Fourier coefficient, a multiplier and an integrator connectable to the output of the respective multiplier, the analysis signal being applied to one input of the multiplier and the direct current voltage signal being applied to the other input of the respective multipliers, whereby the position and magnitude of said non-uniformities are determined from said coefficients.

In one form of the method according to the invention, in order to be able to determine the position and magnitude of the various harmonic components, depending on the order of the respective harmonic components, the analysis signal can be subjected to an attenuating action and the signal that is proportional to the rotational speed can be subjected to a multiplication action, before the multiplying operation. In addition, the product of the analysis signal and the direct current voltage signal, produced from a single revolution, can be used in forming the Fourier coefficients.

It is also of advantage for the static component which generally comprises the load applied to the rotary body, such a tire footprint loading in the case of a vehicle tire, to be separated from the analysis signal by means of an electrical filter circuit. This provides that, when determining the harmonic components, the amplifiers used for this purpose are not operated in their non-linear region. This danger arises particularly because the static component constitutes a multiple of the oscillations of the analysis signal. Thus, by separating out the static component, it is possible to improve the degree of resolution in determining the harmonic components.

It is also of advantage, for the purposes of determining the magnitude and position of the individual harmonic components of the analysis signal, for the electrical signals corresponding to the Fourier coefficients to be chopped into a zero and a 90° component, with a rectangular voltage that is independent of the rotary frequency, and for the two components of the rectangular voltage to be added so that the filtered-out harmonic of the frequency of the rectangular voltage, which is generally substantially higher than the rotary frequency of the body to be tested, represents the magnitude and angular position of the harmonics being sought, relative to any desired zero reference.

By means of suitable rectiviers and smoothing circuits for the magnitude-determining part of a testing operation, and a zero detector and a flip-flop which is reset at the passage-through-zero of the reference phase parameter and reset again at the passage-through zero of the harmonics of this second frequency, it is also possible to obtain the angular position direct current voltage, after smoothing the flip-flop output signal. If the frequency of the rectangular voltage, which is independent of the rotary frequency of the body to be tested, is set at a substantially higher value than the rotary frequency of said body, the smoothing time constants in respect of magnitude and angular position can be made very short relative to the duration of a testing period so that the residual time delay is negligibly small.

As the frequency of the rectangular voltage that is independent of the rotary frequency of the body to be tested can in principle be selected at any value, and the smoothing time constants can thus be made very small, the magnitude and angular position of the harmonic components being sought are available from the Fourier coefficients virtually immediately, that is to say, after one period of the analysis signal. The time required for determining a harmonic component is thus reduced to the shortest possible time, that is to say, the magnitude and angular position of the irregularities or non-uniformities of the rotary body can be determined from a single revolution of the rotary body.

In one embodiment of the apparatus according to the invention, an attenuating means may be provided between the output of the transducers delivering the analysis signal and one input of the respective multipliers, while a multiplying means may be connected between the output of the tachodynamo and the other inputs of the multipliers.

A respective switch may also be provided between the multiplier and the integrator, which switch can be closed, under the control of a rotary pulse transmitter, during one revolution of the rotary body. In this way, the apparatus can be rendered independent of the duration of the period of the analysis signal, and it is also possible to effect storage of the analysis result and to obtain automatic tuning of the said period duration.

In order to separate the static component from the analysis signal an electrical separating circuit may be provided between the outputs of the travel-measuring or force-measuring transducers and the attenuating means.

A method and apparatus according to the present invention will now be described with reference to the accompanying drawings, in which:

Figure 1:
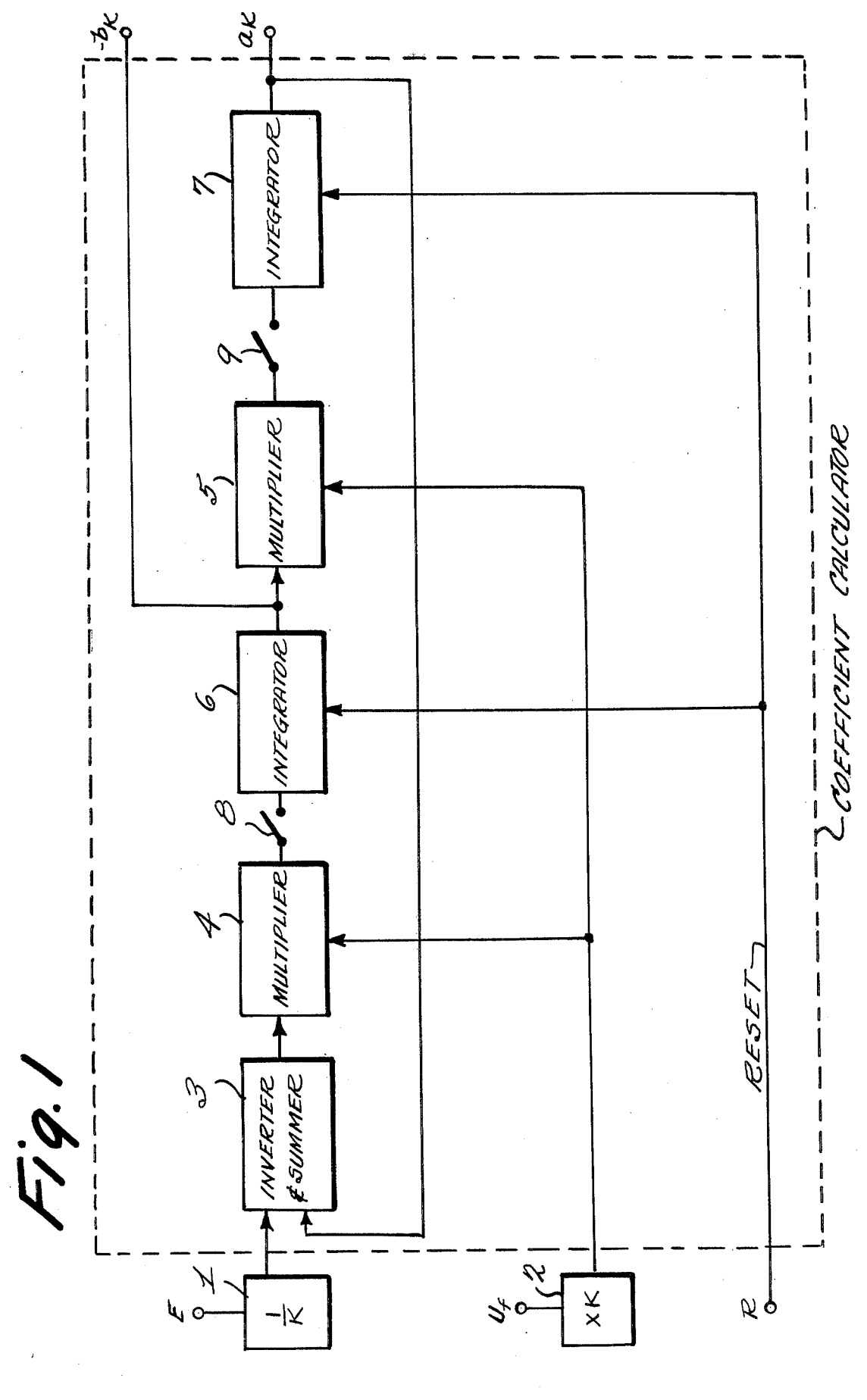

FIG. 1 shows a block circuit diagram of a coefficient calculator or computer used in the invention; and FIG. 2 shows a block circuit diagram of a testing apparatus according to the invention.

The coefficient calculator or computer shown in FIG. 1 comprises two multipliers 4 and 5, two integrators 6 and 7, and switches 8 and 9 between the multipliers 4 and 5 and the respective adjacent integrators 6 and 7. An inverting summing means 3 is connected upstream of the first multiplier 4 and an analysis signal produced by transducers which may be of the kind that measure force applied thereto or of the kind that measure a travel distance is introduced into the arrangement by way of the summing means 3.

Connected upstream of the coefficient computer is an attenuating means 1 by means of which the analysis signal is applied to the inverting summing means 3. Also provided is a multiplying means 2 by means of which a direct current voltage signal that is proportional to the rotational frequency of the body to be balanced is applied to the multipliers 4 and 5. An input R to the coefficient computer is provided for resetting integrators 6 and 7 to zero before the beginning of each analysis operation.

The mode of operation of the arrangement of FIG. 1 is as follows.

The analysis signal appears at input E, while at the input $U_f$ appears the above-mentioned direct current voltage. Opening and closing of the two switches 8 and 9 is effected in fixed phase relative to the rotary performance of the testing apparatus, by means of a rotary pulse transmitter and a counting circuit, as will be described with reference to FIG. 2. The switches 8 and 9 remain closed precisely for a single period of the analysis signal, that is to say, during a single revolution of the rotary body. Activation upon closing of the switches 8 and 9 is effected for example by means of a command M which will be further described below in connection with FIG. 2.

During the time that the switches 8 and 9 are closed, the products of the multiplication operations in the multipliers 4 and 5, being the products of the function of the analysis signal and the multiplied direct current voltage on $U_f$ are transmitted to the integrators 6 and 7 where integration is effected, thereby forming the two Fourier coefficients sought, which are available at outputs $a_k$ and $-b_k$ when the switches 8 and 9 are opened.

The coefficient calculator is automatically tuned to the respective rotational frequency of the rotary body to be tested, by multiplication of the rotational frequency-proportional voltage $U_f$ with the output voltage of the inverting summing means 3, or with the output voltage of the integrator 6 in the multipliers 4 and 5.

Tuning to the original number of the desired harmonic components is effected by suitable adjustment of the attenuating means 1 and the multiplying means 2. Thus, for example, when determining second harmonic components, the function of the analysis signal which is applied to the input E is attenuated to 1/2, while the direct current voltage applied to the input $U_f$ is multiplied by a factor 2. If the first harmonic is to be analyzed, the ordinal number is 1 so that the attenuating means 1 and the multiplying means 2 attenuate and multiply respectively with a factor 1; $k$ in FIG. 1 can be any integer from 1 to $n$.

When the rotational frequency of the rotary member to be tested is constant, the values introduced into the multipliers 4 and 5 are multiplied by the voltage on $U_f$ which in this case is constant. This means that, instead of the multipliers 4 and 5, it is also possible to use scaling amplifiers or suitable evaluation resistors.

The calculation operation of the FIG. 1 arrangement is based on the following mathematical relationships:

A periodic function of the time which corresponds to the variables, with a period $T_o = 2\pi$, such as the analysis signal at the input E, can be expressed by a Fourier series:

$$f(t) = \frac{a_o}{2} + \sum_{k=1}^{k=\infty} a_k \cdot \cos \frac{2\pi \cdot k \cdot t}{T} + \sum_{k=1}^{k=\infty} b_k \cdot \sin \frac{2\pi \cdot k \cdot t}{T} \quad (1)$$

in which $a_k$ and $b_k$ are the so-called Fourier coefficients; and $a_o$ is the status component of the function and can therefore be disregarded.

The Fourier coefficients can be determined in accordance with the following equations:

$$a_k = \frac{1}{\pi} \int_o^{2\pi} f(t) \cos \frac{2\pi \cdot kt}{T} \, dt \quad (2)$$

$$b_k = \frac{1}{\pi} \int_o^{2\pi} f(t) \sin \frac{2\pi \cdot kt}{T} \, dt \quad (3)$$

The terms of the sum of the equation (1) can be combined to a sum function as follows:

$$f(t) = \sum_{k=1}^{k=\infty} C_k \cdot \cos \left( \frac{2\pi \cdot kt}{T} + \phi_k \right) \quad (4)$$

In this equation:

$$C_k = \sqrt{a_k^2 + b_k^2} \quad (5)$$

$$\phi_k = \arctan \frac{b_k}{a_k} \quad (6)$$

in which $C_k$ represents magnitude or amount, and $\phi_k$ represents the position or angle of the maximum value relative to a reference point.

The two direct current voltages at the outputs of the integrators 6 and 7 represent the coefficients $a_k$ and $b_k$. These direct current voltages are subsequently introduced into magnitude and angle calculators or computers, for calculation of $C_k$ and $\phi_k$, as will be seen from FIG. 2.

Referring to FIG. 2, the apparatus for testing the irregularity or non-uniformity of a rotary body such as a motor vehicle tire, includes a testing rim 11 on which a tire 10 is fitted and inflated. The inflated tire is rotated by means of a motor 12, connected to the rim 11 by a shaft 13. Connected to the motor 12 are a tachodynamo 14 for producing a voltage that is proportional to the rotary speed, as mentioned with reference to FIG. 1, and a rotary pulse transmitter 15 for producing a reference pulse for the purposes of determining angular position of the non-uniformity. The signal of the transmitter 15 is applied for shaping to a trigger 16 and subsequently processed in a digital counting circuit 17 in such a way that a command signal M (measure) and a signal R (reset) appear at the output of the circuit 17, after a start command has been applied to the circuit arrangement. The signal R always occurs before the signal M, and is shorter than the signal M. The signal M, being controlled by the transmitter 15, is of precisely the duration of one revolution of the tire 10 to be tested.

The output voltage of the tachodynamo 14 is brought to a level that is suitable for the following circuits by a scaling amplifier 18 and subsequently applied to a low pass filter 19 to supress hum and noise voltages.

A loading wheel 20 is now pressed against the rotating tire 10 in such a way as to provide a predetermined loading thereon.

The loading applied is measured by force measuring transducers 21 and 22 and is subsequently brought to a level that is suitable for the following circuits, by means of scaling amplifiers 23 and 24. In order to obtain the total of the load applied by the loading wheel 20, the outputs of the amplifiers 23 and 24 are added in a summing means 25. The output of the summing means 25 thus provides a voltage which represents the load applied to the tire 10, including radial force variations superimposed thereon. The tire loading is indicated at an instrument 26.

As the static wheel load is no longer required for further signal processing and, as already stated above, can even be a hindrance, the static component is separated out. This separation operation is effected by a capacitor 27 being charged on its plate that is towards the summing means 25, to the voltage level representing the wheel loading. At the beginning of a testing operation, a switch 28 is opened so that the difference between the charge on capacitor 27 and the instantaneous wheel loading signal appears at the input of an impedance convertor 29. This means, however, that only the variation in radial load or force appears at the output of the convertor 29.

A resistor 30 has the function of current limitation; its value is so selected that it remains negligibly small in comparison to the input value of the converter 29. The time constant $T_1 = R.C.$ of the RC member 30, 27 is also negligibly small in relation to the duration of one period of the analysis, signal, i.e., one revolution of the tire 10.

When the switch 28 is opened, the time constants $T_2 = R_E.C$ is very great compared to the duration of one revolution of the body being tested, $R_E$ being the high input resistance of the converter 29.

The force-variation signal which forms the analysis signal is first applied to a low pass filter 31. The damping performance of this filter 31 is so selected that on the one hand no interference amplitude and phase variations occur in the frequency spectrum which is of interest, while on the other hand hum and noise interference is suppressed to the best possible extent.

The output signal from filter 31 is applied to a maximum value storage means 32. This forms a stored direct current voltage that is proportional to the variation in radial force, from the peak-to-peak value of the radial force-variation signal. The stored voltage is displayed at an instrument 33. The measurement and cancellation functions of the storage means 32 are controlled by the above-mentioned digital counter 17 with pulses "R" and "M".

The radial force-variation signal is subsequently applied to a comparing circuit 34. Applied to a second input of the circuit 34 is a comparison voltage which also represents a limit value for the good-bad limit of the radial force variation, which limit value can be selected at an adjustment means 35. If the set comparison voltage is exceeded by the management value, an output relay (not referenced) of the comparing circuits 34 is energized.

The contacts of this output relay cause actuation of lamps 36 and 37 for the good-bad display and of marking means (not shown) which are activated by way of a switch 38, for automatically marking the quality classification of the tire 10 being tested.

For the purposes of determining or analyzing the harmonic components, the radial force-variation signal is also applied to attenuating means 39 to 41 which correspond to the attenuating means 1 in FIG. 1 and in which the signal is attenuated according to the respective ordinal number of the harmonics.

Subsequently, the attenuated signal is applied to coefficient calculators or computers 42 to 44 which correspond to that shown in FIG. 1, to produce the Fourier coefficient $a_k$ and $b_k$.

For this purpose it is necessary for the coefficient calculators or computers to be supplied with the above-mentioned direct current voltage signal that is proportional to the rotational frequency of the tire 10, by way of multiplying means 45 to 47 which correspond to the multiplying means 2 in FIG. 1. The multiplication operation is effected in accordance with the ordinal number of the harmonics being sought. In addition, the control commands "M" (measure) and "R" (reset) are applied from the digital counter 17 to the circuit arrangements 42 to 44 so that these circuits can be started synchronously with the rotational frequencies. As already mentioned above, the command "M" is applied for precisely one revolution, thereby also to define the zero reference in respect of the angle of the harmonics is also defined.

After one revolution, the command "M" (measure is removed and the desired Fourier coefficients are supplied in the form of direct current voltages $U_{ak}$ and $U_{bk}$. These direct current voltages are then applied to magnitude and angle calculators or computers 48 to 50 so that the magnitude $C_k$ and the angle $\phi_k = \text{arc tg} . b_k/a_k$ can be calculated. These can operate on the principle known from UK Pat. No. 860 847.

The magnitude and the angular position forming the result are available in the form of direct current voltages directly after one measuring revolution has been made and are displayed at magnitude display instruments 51 to 53 and angle display instruments 54 to 56. The direct current voltages which correspond to the harmonic radial force-variations can also be applied to comparing means for the good-bad decision, similarly to the above-described arrangement 34 to 38.

The direct current voltage representing the angle of the first harmonics is indicated and can also be used to mark the limit values, by comparing it to an angle-proportional direct current voltage. If both voltages are equal, a corresponding marking apparatus can be actuated.

The angle values of the second and higher harmonics are generally applied only to a display device. To simplify the above-mentioned circuit construction in which a component calculator or computer 42 to 44 and associated attenuating means 39 to 41 and multiplying means 45 to 47, as well as angle display instruments 51 to 53 and 54 to 56, which are each connected in parallel to each other, are required for each harmonic component, for the purposes of determining the magnitude and angle of the second and higher harmonics the various magnitude and angle calculators or computers can be omitted if the circuit arrangement 48 for the first harmonic is switched over to the outputs of the calculators or computers 42 to 44. In such a case we talk of "interrogating" the harmonics by switching over.

The above-described method and apparatus permit the magnitude and the angular position of non-uniformities of a rotary body to be determined, independently of the rotary speed at which the rotary body is rotated.

In the above-described apparatus the analysis results are available immediately after the expiration of one period of the analysis signal, and independently of the period duration, the analysis results being in the form of direct current voltages which represent the magnitude and the angle of the periodic variables of the harmonics to be analyzed. The displayed angular values are independent of the period duration and can be phase-shifted so that the zero reference for the angle calculation operation can be provided at any desired position on the periphery of the rotary body to be tested. In addition, the apparatus can automatically be tuned to the duration of the period of the analysis signal, while the amplitudes of the direct current voltage values which represent the magnitude and angle of the analysis data are independent of frequency. The apparatus can also be used without great difficulties for analyzing harmonics of a higher order.

Many changes and modifications in the above described embodiment can, of course, be carried out without departing from the scope of the invention. Accordingly, that scope is intended to be limited only by the scope of the appended claims.

What is claimed is:
1. A method of testing the uniformity of a rotary body comprising the steps of:
rotating said body;
producing, by means of transducers coupled to receive vibrations from the rotary body, an electrical analysis signal having an amplitude which varies as a function of the non-uniformities;
producing a direct current voltage signal which varies in amplitude as a function of the speed of rotation of the rotary body;
multiplying said direct current voltage and analysis signals to produce a further signal;
integrating the said further signal to provide the harmonic Fourier coefficients of the Fourier development series of the analysis signal; and
determining the magnitude and phase position of the non-uniformities from said Fourier coefficients.

2. A method according to claim 1, including the further steps of attenuating by 1/K, K being an integer between 1 and $n$, said analysis signal, K being determined by the order of the harmonic components whose Fourier coefficients are determined, and multiplying by K said direct current voltage signal.

3. A method according to claim 1, wherein the product obtained from a single revolution of said rotary body of the analysis signal and said direct current voltage signal, is used in forming the Fourier coefficients.

4. A method according to claim 1, including the further step of separating the static component from the analysis signal by an electrical filter circuit.

5. A method according to claim 1 including the further steps of chopping the electrical direct current voltage values corresponding to said harmonic Fourier coefficients into a zero and a 90° component, with a rectangular voltage that is independent of the rotary frequency of said rotary body, and adding said components, whereby the filtered harmonic of the frequency of the rectangular voltage, in amount and phase position relative to any desired zero reference, represents the magnitude and angular position of the harmonic being sought.

6. An apparatus for testing the uniformity of a rotary body comprising:
transducer means for producing an analysis signal having an amplitude proportional to non-uniformities of said rotary body;
a tachodynamo for producing a direct current voltage signal proportional to the rotational frequency of the rotary body; and
means for forming harmonic Fourier coefficients of the Fourier series of the analysis signal, said means comprising, for each said Fourier coefficient a multiplier and an integrator connected to the output of the respective multiplier, the analysis signal being applied to one input of the multiplier and said direct current voltage signal being applied to the other input of the respective multipliers, whereby the position and magnitude of said non-uniformities are determined from said coefficients.

7. An apparatus as in claim 6, including means for rotating said rotary body.

8. Apparatus according to claim 6 including attenuating means connected between the output of said transducer means and said one input of the multipliers, and multiplying means between the output of the tachodynamo and said other input of the multipliers.

9. Apparatus according to claim 6 including a respective switch connected between each said multiplier and the associated integrator, and including a rotary pulse transmitter for closing the switches during one revolution of the rotary body.

10. Apparatus according to claim 8, including a separating circuit, for separating out the static component from the analysis signal, between the output of said transducer means and the attenuating means.

11. Apparatus according to claim 8, further including a plurality of component calculators with associated said attenuating means and associated said multiplying means, and a corresponding plurality of magnitude and angle display means connected to the outputs of the respective component calculators, each of said calculators corresponding to a respective harmonic and said calculators being connected in parallel with each other.

12. Apparatus according to claim 8, further including a component calculator with an associated magnitude and angle display instrument, a plurality of said attenuating means and multiplying means, and means for connecting said attenuating means and said multiplying means successively to the calculator, according to the desired harmonics to be obtained.

13. An apparatus for testing the uniformity of a rotary body comprising:

means for rotating said body;

transducer means coupled to receive vibrations from the rotary body for producing an electrical analysis signal having an amplitude which varies as a function of the non-uniformities;

means for producing a direct current voltage signal which varies in amplitude as a function of the speed of rotation of the rotary body;

means for multiplying said direct current voltage and analysis signals to produce a further signal;

means for integrating the said further signal to provide the harmonic Fourier coefficients of the Fourier development series of the analysis signal; and means for determining the magnitude and phase position of the non-uniformities from said Fourier coefficients.

* * * * *